US010635917B1

United States Patent
Kim et al.

(10) Patent No.: US 10,635,917 B1
(45) Date of Patent: Apr. 28, 2020

(54) METHOD AND DEVICE FOR DETECTING VEHICLE OCCUPANCY USING PASSENGER'S KEYPOINT DETECTED THROUGH IMAGE ANALYSIS FOR HUMANS' STATUS RECOGNITION

(71) Applicant: STRADVISION, INC., Pohang-si (KR)

(72) Inventors: Kye-Hyeon Kim, Seoul (KR); Yongjoong Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Dongsoo Shin, Suwon-si (KR); Donghun Yeo, Pohang-si (KR); Wooju Ryu, Pohang-si (KR); Myeong-Chun Lee, Pohang-si (KR); Hyungsoo Lee, Seoul (KR); Taewoong Jang, Seoul (KR); Kyungjoong Jeong, Pohang-si (KR); Hongmo Je, Pohang-si (KR); Hojin Cho, Pohang-si (KR)

(73) Assignee: STRADVISION, INC., Pohang (KR)

( * ) Notice: Subject to any disclaimer, the term of this patent is extended or adjusted under 35 U.S.C. 154(b) by 0 days.

(21) Appl. No.: 16/721,957

(22) Filed: Dec. 20, 2019

Related U.S. Application Data

(60) Provisional application No. 62/798,981, filed on Jan. 30, 2019.

(51) Int. Cl.
| | |
|---|---|
| *G06K 9/00* | (2006.01) |
| *G06K 9/62* | (2006.01) |
| *G06K 9/46* | (2006.01) |

(52) U.S. Cl.
CPC ......... *G06K 9/00838* (2013.01); *G06K 9/46* (2013.01); *G06K 9/6202* (2013.01);
(Continued)

(58) Field of Classification Search
CPC .... G06K 9/00838; G06K 9/46; G06K 9/6202; G06K 9/6232; G06K 9/6256; G06K 9/6262
See application file for complete search history.

(56) References Cited

U.S. PATENT DOCUMENTS

| | | | |
|---|---|---|---|
| 10,322,728 B1 * | 6/2019 | Porikli | G06K 9/00845 |
| 2018/0157918 A1 * | 6/2018 | Levkova | G06T 7/215 |

(Continued)

*Primary Examiner* — Shefali D Goradia
(74) *Attorney, Agent, or Firm* — Xsensus LLP

(57) ABSTRACT

A method for detecting a vehicle occupancy by using passenger keypoints based on analyzing an interior image of a vehicle is provided. The method includes steps of: (a) if the interior image is acquired, a vehicle occupancy detecting device (i) inputting the interior image into a feature extractor network, to generate feature tensors by applying convolution operation to the interior image, (ii) inputting the feature tensors into a keypoint heatmap & part affinity field (PAF) extractor, to generate keypoint heatmaps and PAFs, (iii) inputting the keypoint heatmaps and the PAFs into a keypoint detecting device, to extract keypoints from the keypoint heatmaps, and (iv) grouping the keypoints based on the PAFs, to detect keypoints per passengers; and (b) inputting the keypoints into a seat occupation matcher, to match the passengers with seats by referring to the inputted keypoints and preset ROIs for the seats and to detect the vehicle occupancy.

16 Claims, 6 Drawing Sheets

(52) U.S. Cl.
CPC ......... *G06K 9/6232* (2013.01); *G06K 9/6256* (2013.01); *G06K 9/6262* (2013.01)

(56) References Cited

U.S. PATENT DOCUMENTS

| | | | |
|---|---|---|---|
| 2019/0065872 A1* | 2/2019 | Yamanaka | G06K 9/6277 |
| 2019/0152390 A1* | 5/2019 | Levkova | G06K 9/00228 |

* cited by examiner

METHOD AND DEVICE FOR DETECTING VEHICLE OCCUPANCY USING PASSENGER'S KEYPOINT DETECTED THROUGH IMAGE ANALYSIS FOR HUMANS' STATUS RECOGNITION

CROSS REFERENCE TO RELATED APPLICATION

This application claims the benefit of priority to U.S. Provisional Patent Application No. 62/798,981, filed on Jan. 30, 2019, the entire contents of which being incorporated herein by reference.

FIELD OF THE DISCLOSURE

The present disclosure relates to a method for detecting a vehicle occupancy by using one or more keypoints of at least one passenger detected by an image analysis for humans' status recognition; and more particularly, to the method for analyzing at least one interior image of a vehicle, detecting the keypoints corresponding to the passenger by a human body keypoint detecting device for passenger detection, and confirming with which seats of the vehicle the detected passengers match, to thereby detect the vehicle occupancy, and the device using the same.

BACKGROUND OF THE DISCLOSURE

Generally, passenger seats are provided in a passenger compartment of a vehicle. A driver's seat or passengers' seats include various passenger detecting devices capable of identifying a type of a passenger when the passenger is seated, determining a presence or an absence of the passenger, and indicating whether the seat belt is worn.

Among them, a pattern recognition system, a pressure recognition system, and a weight recognition system are most widely used. In the pattern recognition system, a sensor mat is provided in a seat of the vehicle, and pressure sensors are arranged in a matrix form on the sensor mat, and the passenger is detected and identified by recognizing the weight and pelvic pattern of the passenger seated in the seat.

In the pressure recognition system, a thin bladder and pressure sensors are arranged on a lower side of a seat cushion. When the passenger is seated, the pressure sensors sense the liquid flowing out of the bladder and thus the passenger is detected and identified.

In the weight recognition system, a strain gauge sensor is arranged at a position where a seat frame inside a seat is mounted. Then the weight of the passenger is detected and thus the passenger is detected and identified.

However, even if a variety of the passenger detecting devices are provided as described above, various detection errors occur. For example, if the passenger is seated on one side of the seat or not seated properly, the passenger detecting devices determine that no passenger is seated, or if an underweight adult is seated, the devices identify the passenger as a child.

If the adult passenger is mistakenly identified as a child due to such an error, then when a car accident occurs, an airbag is deployed so as to correspond to the shape of the child which is not safe for an adult, resulting in a secondary injury.

Further, if the passenger is detected as not seated, many problems arise due to an error in identification of the passenger, for example, the passenger may suffer a serious injury because the airbag is not deployed.

In addition to this, since a sensor is required for every seat of the vehicle, not only the cost is increased, but also the information to be processed is increased, and therefore the processing speed is reduced.

Therefore, recently, techniques for detecting the passenger of the vehicle or detecting the number of passengers using images photographed by a camera have been developed.

That is, by referring to FIG. 1, cameras are installed outside a vehicle, that is, on a road and structures near the road, and then images obtained from the cameras are analyzed to measure the number of passengers on the vehicle. Through this, a front seat of the vehicle is confirmed by a camera on the structures, and a rear seat of the vehicle is confirmed by a camera on the roadside.

However, when the camera on the roadside and the camera on the structures are used, it is difficult to confirm the number of passengers on the vehicle when the interior of the vehicle is invisible due to darkness, snow, rain, tinted windshields, etc.

SUMMARY OF THE DISCLOSURE

It is an object of the present disclosure to solve all the aforementioned problems.

It is another object of the present disclosure to detect a vehicle occupancy without an increase in a cost.

It is still another object of the present disclosure to detect the vehicle occupancy without regard to surroundings.

It is still yet another object of the present disclosure to detect the vehicle occupancy, minimizing information to process.

In accordance with one aspect of the present disclosure, there is provided a method for detecting a vehicle occupancy by using a passenger keypoint based on analysis of an interior image of a vehicle, including steps of: (a) if the interior image of the vehicle is acquired, a vehicle occupancy detecting device performing (i) a process of inputting the interior image into a feature extractor network, to thereby allow the feature extractor network to generate one or more feature tensors by applying convolution operation to the interior image, (ii) a process of inputting the feature tensors into a keypoint heatmap & part affinity field extractor, to thereby allow the keypoint heatmap & part affinity field extractor to generate keypoint heatmaps and part affinity fields for each of the feature tensors, (iii) a process of inputting the keypoint heatmaps and the part affinity fields into a keypoint detecting device, to thereby allow the keypoint detecting device to extract keypoints from each of the keypoint heatmaps, and (iv) a process of grouping the extracted keypoints by referring to each of the part affinity fields, to thereby detect keypoints per each of passengers corresponding to each of passengers in the interior image; and (b) the vehicle occupancy detecting device performing a process of inputting the keypoints per each of the passengers into a seat occupation matcher, to thereby allow the seat occupation matcher to match each of the passengers with each of seats of the vehicle by referring to the keypoints per each of the passengers and preset ROIs for each of the seats and thus to detect the vehicle occupancy.

As one example, at the step of (a), the vehicle occupancy detecting device performs a process of inputting the interior image into the feature extractor network, to thereby allow the feature extractor network to apply multiple convolution operations, by convolutional blocks including one or more convolutional layers performing the multiple convolution operations, to the interior image.

As one example, at the step of (a), the vehicle occupancy detecting device performs a process of inputting the feature tensors into the keypoint heatmap & part affinity field extractor, to thereby allow the keypoint heatmap & part affinity field extractor to apply convolution operation, by a fully convolutional network or 1×1 convolutional layers, to the feature tensors and thus to generate the keypoint heatmaps and the part affinity fields for each of the feature tensors.

As one example, at the step of (a), the vehicle occupancy detecting device performs a process of inputting the keypoint heatmaps and the part affinity fields into the keypoint detecting device, to thereby allow the keypoint detecting device to extract each of highest points on each of the keypoint heatmaps as each of the keypoints corresponding to said each of the keypoint heatmaps.

As one example, the vehicle occupancy detecting device allows the keypoint detecting device to pair the keypoints, respectively having their own corresponding highest probabilities of being connected to each other among the extracted keypoints by referring to the part affinity fields, to thereby group the extracted keypoints.

As one example, at the step of (b), the vehicle occupancy detecting device performs a process of instructing the seat occupation matcher to calculate each of mean points of the keypoints per each of the passengers and each of variances of the keypoints per each of the passengers and to match each of the passengers with each of the seats by confirming whether (i) the keypoints per each of the passengers, (ii) each of the mean points of the keypoints per each of the passengers and (iii) each of the variances of the keypoints per each of the passengers satisfy at least one preset condition, for each of the preset ROIs for each of the seats.

As one example, the vehicle occupancy detecting device performs a process of instructing the seat occupation matcher to match a specific passenger with a specific seat (i) if a specific mean point corresponding to the specific passenger is located in a specific ROI, (ii) if a specific variance corresponding to the specific passenger is lower than a first preset threshold, and (iii) if the number of specific keypoints corresponding to the specific passenger located in the specific ROI is larger than a second preset threshold, for the specific ROI of the specific seat.

As one example, the feature extractor network and the keypoint heatmap & part affinity field extractor have been learned by a learning device performing, if at least one training image including one or more objects for training is acquired, (i) a process of inputting the training image into the feature extractor network, to thereby allow the feature extractor network to generate one or more feature tensors for training by applying convolution operation to the training image, (ii) a process of inputting the feature tensors for training into the keypoint heatmap & part affinity field extractor, to thereby allow the keypoint heatmap & part affinity field extractor to generate keypoint heatmaps for training and part affinity fields for training for each of the feature tensors for training, (iii) a process of inputting the keypoint heatmaps for training and the part affinity fields for training into the keypoint detecting device, to thereby allow the keypoint detecting device to extract keypoints for training from each of the keypoint heatmaps for training and a process of grouping the extracted keypoints for training by referring to each of the part affinity fields for training, to thereby detect keypoints per each of the objects for training corresponding to each of the objects for training in the training image, and (iv) a process of allowing a loss layer to calculate one or more losses by referring to the keypoints per each of the objects for training and their corresponding ground truths, to thereby adjust one or more parameters of the feature extractor network and the keypoint heatmap & part affinity field extractor such that the losses are minimized by backpropagation using the losses.

In accordance with another aspect of the present disclosure, there is provided a vehicle occupancy detecting device for detecting a vehicle occupancy by using a passenger keypoint based on analysis of an interior image of a vehicle, including: at least one memory that stores instructions; and at least one processor configured to execute the instructions to perform or support another device to perform: (I) if the interior image of the vehicle is acquired, (i) a process of inputting the interior image into a feature extractor network, to thereby allow the feature extractor network to generate one or more feature tensors by applying convolution operation to the interior image, (ii) a process of inputting the feature tensors into a keypoint heatmap & part affinity field extractor, to thereby allow the keypoint heatmap & part affinity field extractor to generate keypoint heatmaps and part affinity fields for each of the feature tensors, (iii) a process of inputting the keypoint heatmaps and the part affinity fields into a keypoint detecting device, to thereby allow the keypoint detecting device to extract keypoints from each of the keypoint heatmaps, and (iv) a process of grouping the extracted keypoints by referring to each of the part affinity fields, to thereby detect keypoints per each of passengers corresponding to each of passengers in the interior image, and (II) a process of inputting the keypoints per each of the passengers into a seat occupation matcher, to thereby allow the seat occupation matcher to match each of the passengers with each of seats of the vehicle by referring to the keypoints per each of the passengers and preset ROIs for each of the seats and thus to detect the vehicle occupancy.

As one example, at the process of (I), the processor performs a process of inputting the interior image into the feature extractor network, to thereby allow the feature extractor network to apply multiple convolution operations, by convolutional blocks including one or more convolutional layers performing the multiple convolution operations, to the interior image.

As one example, at the process of (I), the processor performs a process of inputting the feature tensors into the keypoint heatmap & part affinity field extractor, to thereby allow the keypoint heatmap & part affinity field extractor to apply convolution operation, by a fully convolutional network or 1×1 convolutional layers, to the feature tensors and thus to generate the keypoint heatmaps and the part affinity fields for each of the feature tensors.

As one example, at the process of (I), the processor performs a process of inputting the keypoint heatmaps and the part affinity fields into the keypoint detecting device, to thereby allow the keypoint detecting device to extract each of highest points on each of the keypoint heatmaps as each of the keypoints corresponding to said each of the keypoint heatmaps.

As one example, the processor allows the keypoint detecting device to pair the keypoints, respectively having their own corresponding highest probabilities of being connected to each other among the extracted keypoints by referring to the part affinity fields, to thereby group the extracted keypoints.

As one example, at the process of (II), the processor performs a process of instructing the seat occupation matcher to calculate each of mean points of the keypoints per each of the passengers and each of variances of the keypoints per each of the passengers and to match each of the passengers with each of the seats by confirming whether (i) the keypoints per each of the passengers, (ii) each of the mean points of the keypoints per each of the passengers and (iii) each of the variances of the keypoints per each of the passengers satisfy at least one preset condition, for each of the preset ROIs for each of the seats.

As one example, the processor performs a process of instructing the seat occupation matcher to match a specific passenger with a specific seat (i) if a specific mean point corresponding to the specific passenger is located in a specific ROI, (ii) if a specific variance corresponding to the specific passenger is lower than a first preset threshold, and (iii) if the number of specific keypoints corresponding to the specific passenger located in the specific ROI is larger than a second preset threshold, for the specific ROI of the specific seat.

As one example, the feature extractor network and the keypoint heatmap & part affinity field extractor have been learned by a learning device performing, if at least one training image including one or more objects for training is acquired, (i) a process of inputting the training image into the feature extractor network, to thereby allow the feature extractor network to generate one or more feature tensors for training by applying convolution operation to the training image, (ii) a process of inputting the feature tensors for training into the keypoint heatmap & part affinity field extractor, to thereby allow the keypoint heatmap & part affinity field extractor to generate keypoint heatmaps for training and part affinity fields for training for each of the feature tensors for training, (iii) a process of inputting the keypoint heatmaps for training and the part affinity fields for training into the keypoint detecting device, to thereby allow the keypoint detecting device to extract keypoints for training from each of the keypoint heatmaps for training and a process of grouping the extracted keypoints for training by referring to each of the part affinity fields for training, to thereby detect keypoints per each of the objects for training corresponding to each of the objects for training in the training image, and (iv) a process of allowing a loss layer to calculate one or more losses by referring to the keypoints per each of the objects for training and their corresponding ground truths, to thereby adjust one or more parameters of the feature extractor network and the keypoint heatmap & part affinity field extractor such that the losses are minimized by backpropagation using the losses.

In addition, recordable media readable by a computer for storing a computer program to execute the method of the present disclosure is further provided.

BRIEF DESCRIPTION OF THE DRAWINGS

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Figure 1:
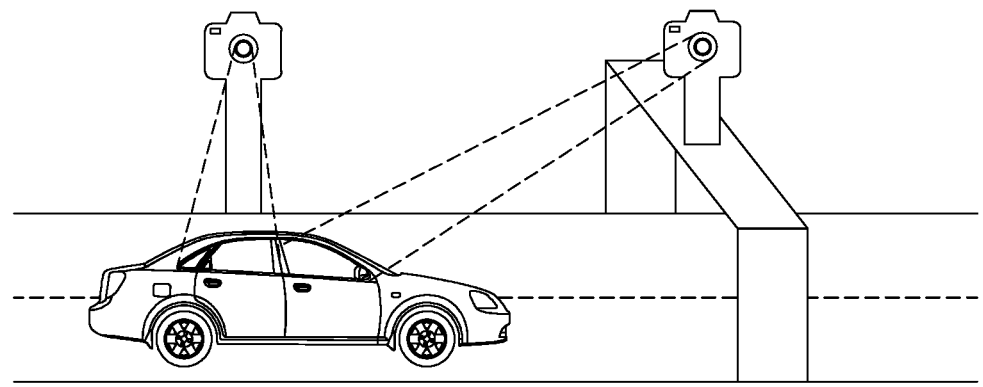
FIG. 1 is a drawing schematically illustrating a prior art where images obtained from cameras installed outside a vehicle are analyzed to measure the number of passengers in the vehicle.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the invention.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, similar reference numerals refer to the same or similar functionality throughout the several aspects.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

The headings and abstract of the present disclosure provided herein are for convenience only and do not limit or interpret the scope or meaning of the embodiments.

To allow those skilled in the art to carry out the present disclosure easily, the example embodiments of the present disclosure by referring to attached diagrams will be explained in detail as shown below.

Figure 2:
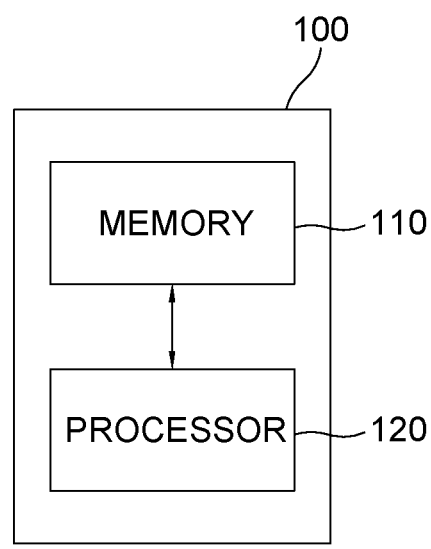
FIG. 2 is a drawing schematically illustrating a vehicle occupancy detecting device for detecting a vehicle occupancy by using one or more keypoints of at least one passenger detected by an image analysis in accordance with one example embodiment of the present disclosure.

FIG. 2 is a drawing schematically illustrating a vehicle occupancy detecting device for detecting a vehicle occupancy by using one or more keypoints of at least one passenger detected by an image analysis in accordance with one example embodiment of the present disclosure. By referring to FIG. 2, the vehicle occupancy detecting device 100 may include a memory 110 for storing instructions to detect the vehicle occupancy by using the keypoints of the passenger detected by the image analysis, and a processor 120 for performing processes corresponding to the instructions in the memory 110 to detect the vehicle occupancy by using the keypoints of the passenger detected by the image analysis.

Specifically, the vehicle occupancy detecting device 100 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

However, such description of the computing device does not exclude an integrated device including any combination of a processor, a memory, a medium, or any other computing components for implementing the present disclosure.

Figure 3:
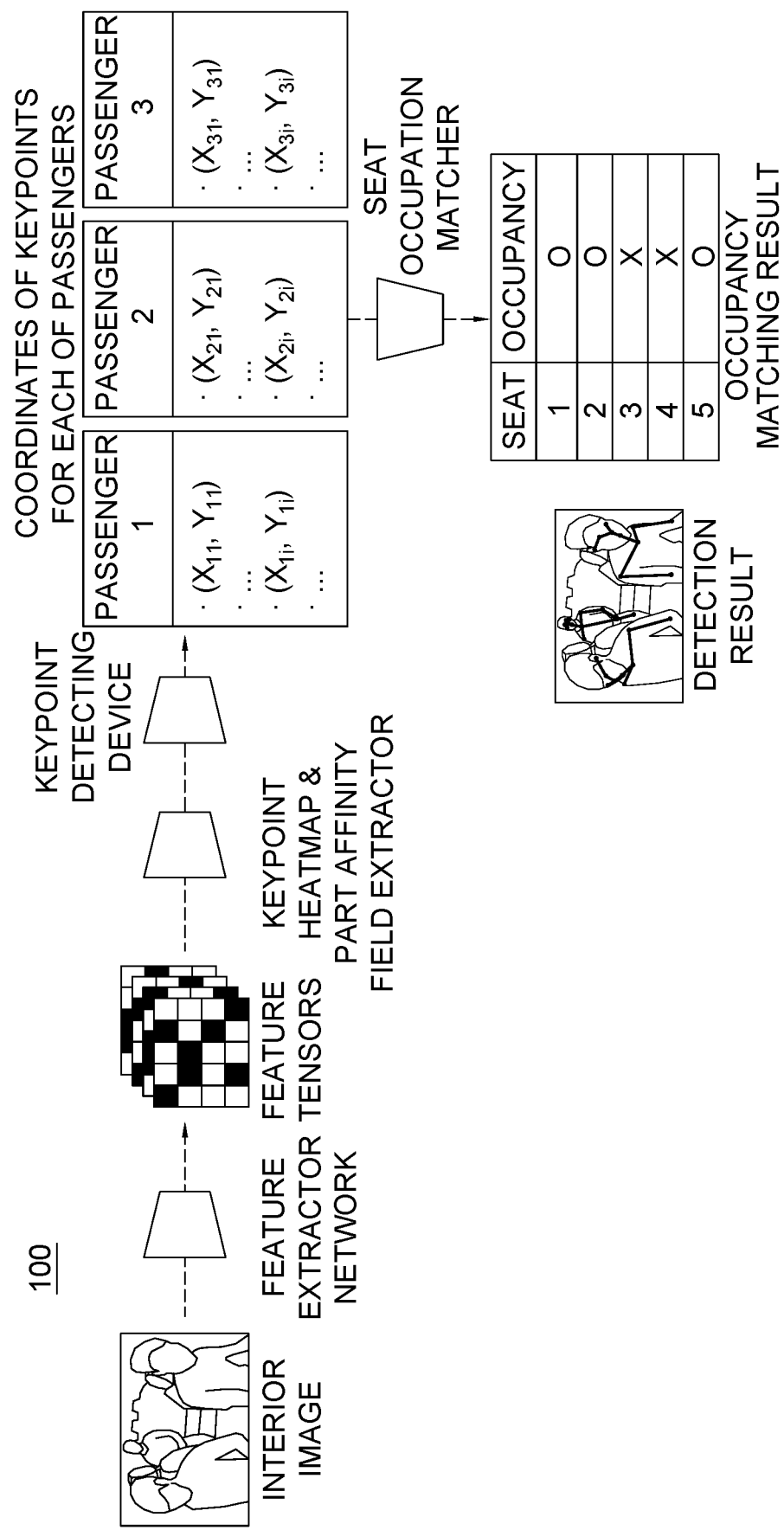
FIG. 3 is a drawing schematically illustrating a method for detecting the vehicle occupancy by using the keypoints of the passenger detected by the image analysis in accordance with one example embodiment of the present disclosure.

A method for detecting the vehicle occupancy by using the keypoints of the passenger detected through the image analysis via the vehicle occupancy detecting device 100 in accordance with one example embodiment of the present disclosure is described by referring to FIG. 3 as follows.

First, if at least one interior image generated by a camera photographing an interior of a vehicle is acquired, the vehicle occupancy detecting device 100 may input the interior image into a feature extractor network, to thereby allow the feature extractor network to apply its convolution operation to the interior image, and thus to generate feature tensors corresponding to the interior image.

Herein, the feature extractor network may allow one or more convolution blocks, including one or more convolutional layers capable of performing at least one convolution operation, to apply multiple convolution operations to the interior image.

Then, the vehicle occupancy detecting device 100 may input the feature tensors into a keypoint heatmap & part affinity field (PAF) extractor, to thereby instruct the keypoint heatmap & part affinity field extractor to generate keypoint heatmaps and part affinity fields corresponding to each of the feature tensors.

Herein, the keypoint heatmap & part affinity field extractor may include a fully convolutional network.

Also, the keypoint heatmap & part affinity field extractor may include one or more 1×1 convolutional layers which apply at least one 1×1 convolution operation to the feature tensors.

Figure 4:
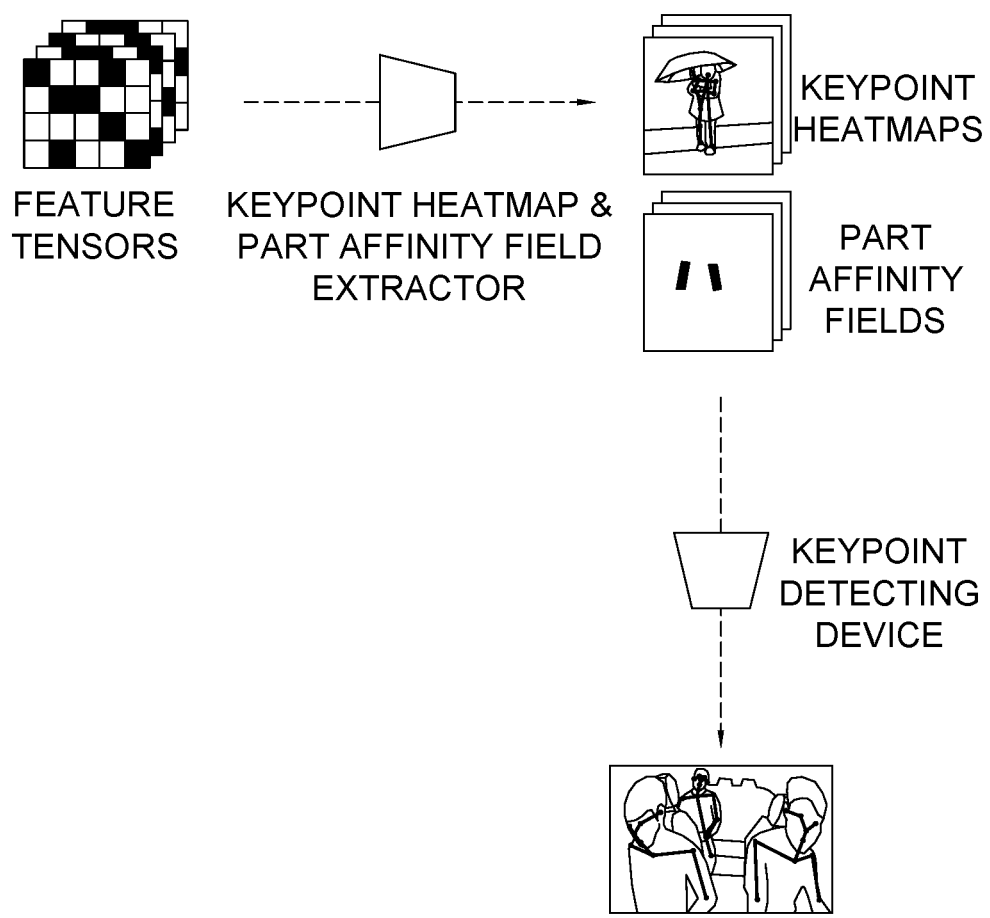
FIG. 4 is a drawing schematically illustrating a process of detecting the keypoints of the passenger in the method for detecting the vehicle occupancy by using the keypoints of the passenger detected by the image analysis in accordance with one example embodiment of the present disclosure.

Meanwhile, by referring to FIG. 4, a meaning of "the keypoint heatmap" may represent a combination of heat and a map, which may graphically show various information that can be expressed by colors as heat-like distribution on an image.

And, the part affinity fields may be a kind of vector map representing relations among the keypoints. That is, the part affinity fields may be a map showing connections of a specific keypoint with other keypoints, and may be a map representing each of mutual connection probabilities of each of the keypoints in each of keypoint heatmap pairs.

Herein, the keypoint heatmap & part affinity field extractor may detect the relations among the keypoints by using a bipartite matching, to thereby generate the part affinity fields. That is, it may be confirmed by the bipartite matching that which keypoints belong to which passengers, and that what the relations among the keypoints are.

Thereafter, the vehicle occupancy detecting device 100 may input the keypoint heatmaps and the part affinity fields into a keypoint detecting device, to thereby allow the keypoint detecting device to extract the keypoints from each of the keypoint heatmaps, and may group the extracted keypoints by referring to the part affinity fields, to thereby detect the keypoints per each of the passengers which correspond to each of the passengers located in the interior image.

Herein, the keypoint detecting device may extract each of highest points in each of the keypoint heatmaps corresponding to each channel, that is, each of points having the highest heat value, as each of the keypoints corresponding to each of the keypoint heatmaps, and may pair the keypoints, respectively having their own corresponding highest probabilities of being connected to each other among the extracted keypoints, to thereby group the extracted keypoints by referring to the part affinity fields. As one example, a process of connecting a first keypoint among the extracted keypoints and a second keypoint among the extracted keypoints as a pair may be performed if the second keypoint is determined to have its corresponding highest probability of being connected to the first keypoint among the extracted keypoints. Herein, such a process may be performed with respect to all the extracted keypoints. Then, as a result, the extracted keypoints may be classified into one or more groups. Herein, the number of the groups may be determined according to the number of the passengers in the interior image.

And, the detected keypoints per each of the passengers may be expressed as coordinate information of their locations in the interior image.

Meanwhile, videos or images taken by the camera mounted in the interior of the vehicle have much occlusion of bodies, that is, in general, in case of a front seat, only an upper body of the passenger is shown and a rear seat is blocked by the front seat. In those cases, a conventional object detecting device will fail to detect the passenger with much occlusion, however, in accordance with the present disclosure, the detected keypoints are sufficient for determining whether the passenger is present, and because the passenger on the vehicle has a pose variation larger than that of a pedestrian, it is advantageous to use the keypoints of the passenger, in accordance with the present disclosure, for detecting the passenger.

Figure 5:
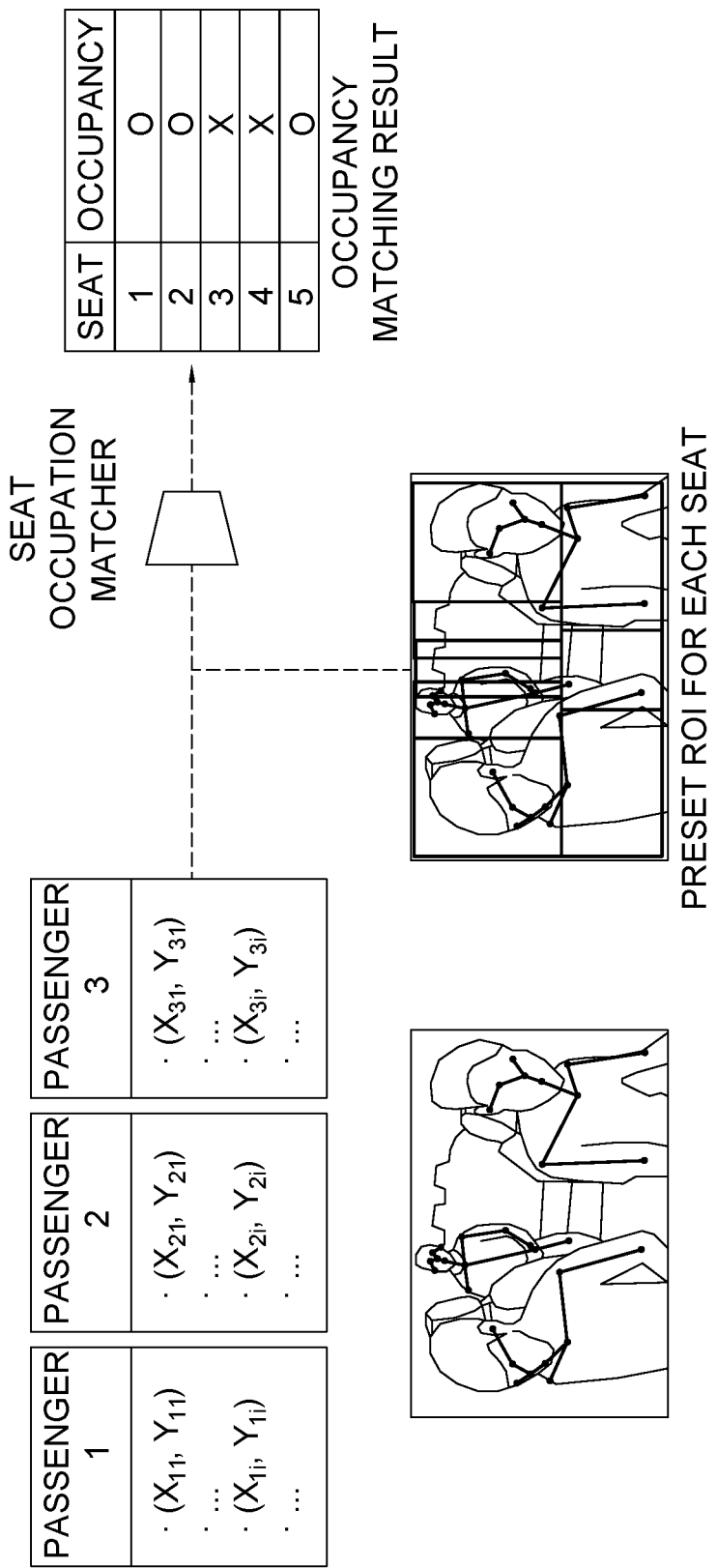
FIG. 5 is a drawing schematically illustrating a process of matching the keypoints of the passenger with a seat of the vehicle in the method for detecting the vehicle occupancy by using the keypoints of the passenger detected by the image analysis in accordance with one example embodiment of the present disclosure.

Next, by referring to FIG. 5, the vehicle occupancy detecting device 100 may perform a process of inputting the keypoints per each of the passengers, acquired from the keypoint detecting device, into a seat occupation matcher, to thereby allow the seat occupation matcher to match each of the passengers with each of seats of the vehicle by referring to the keypoints per each of the passengers and preset ROIs (Regions Of Interest) for each of the seats and thus to detect the vehicle occupancy.

As one example, the vehicle occupancy detecting device 100 may input the keypoints for each of the passengers acquired from the keypoint detecting device, that is, coordinates of the keypoints, into the seat occupation matcher.

Then, the seat occupation matcher may calculate each of mean points and each of variances of each group of the keypoints corresponding to each of the passengers, for example, the keypoints of a head and a body.

And, the seat occupation matcher may match each of the passengers with each of the seats by confirming whether (i) the keypoints per each of the passengers, (ii) each of the mean points per each of the passengers and (iii) each of the variances of the keypoints per each of the passengers satisfy at least one preset condition, for each of the preset ROIs for each of the seats.

That is, supposing that the keypoints for each of the passengers belong to each of keypoint groups of each of the passengers, then for a specific ROI predefined corresponding to a specific seat, whether a specific mean point of a specific keypoint group corresponding to a specific passenger is located in the specific ROI may be determined. Herein, if the specific mean point is determined as not located in the specific ROI, then it may be determined that the specific passenger does not match with the specific seat.

Also, whether a specific variance of the specific keypoint group is equal to or less than a first prescribed threshold may be determined. Herein, the first prescribed threshold may be used for excluding misdetected keypoints, and if the specific variance is determined as greater than the first prescribed threshold then it may be determined that the specific passenger does not match with the specific seat.

And, whether the number of the specific keypoints of the specific keypoint group in the specific ROI is equal to or greater than a second prescribed threshold may be determined. Herein, the second prescribed threshold may be used for excluding misdetected keypoints, and if the number of the specific keypoints of the specific keypoint group in the specific ROI is determined as less than the second prescribed threshold then it may be determined that the specific passenger does not match with the specific seat.

Therefore, in case that the specific mean point is located in the specific ROI, that the specific variance is equal to or less than the first prescribed threshold, and that the number of the specific keypoints of the specific keypoint group in the specific ROI is equal to or greater than the second prescribed threshold, the seat occupation matcher may determine that the specific passenger matches with the specific seat.

As a result, the seat occupation matcher may match each of the passengers with each of the seats of the vehicle, and accordingly, the vehicle occupancy detecting device 100 may detect the vehicle occupancy.

Meanwhile, the feature extractor network and the keypoint heatmap & part affinity field extractor of the vehicle occupancy detecting device 100 may have been learned in advance by a learning device.

Figure 6:
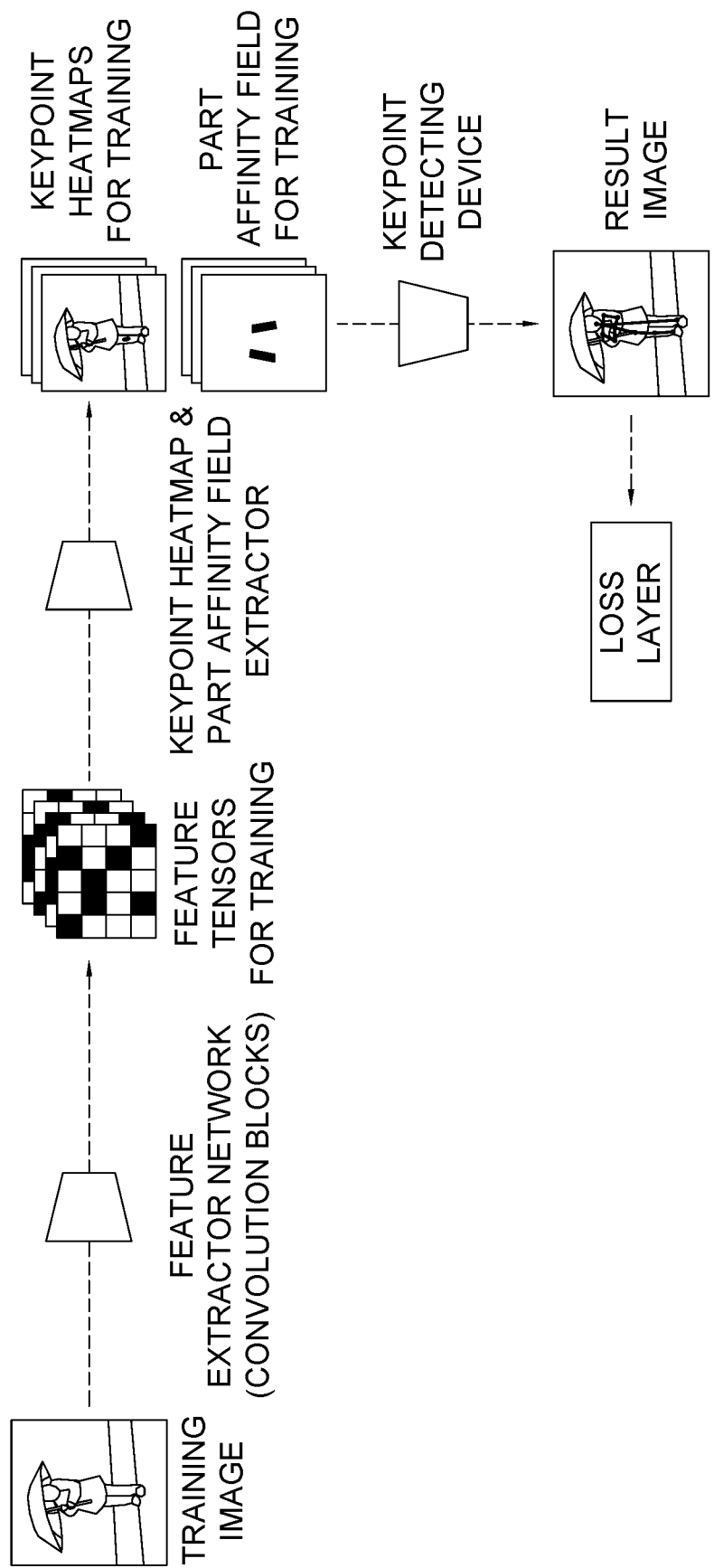
FIG. 6 is a drawing schematically illustrating a process of learning a feature extractor network and a keypoint heatmap & part affinity field extractor for detecting the vehicle occupancy by using the keypoints of the passenger detected by the image analysis in accordance with one example embodiment of the present disclosure.

The method of learning the feature extractor network and the keypoint heatmap & part affinity field extractor is briefly described as follows, by referring to FIG. 6. In the description below, the part easily deducible from the explanation of FIGS. 1 to 5 will be omitted.

First, if at least one training image including at least one object for training is acquired, the learning device 200 may input the training image into the feature extractor network, to thereby allow the feature extractor network to apply its convolution operation to the training image, and thus to generate feature tensors for training.

Then, the learning device 200 may input the feature tensors for training into the keypoint heatmap & part affinity field extractor, to thereby instruct the keypoint heatmap & part affinity field extractor to generate keypoint heatmaps for training and part affinity fields for training, for each of the feature tensors for training.

Thereafter, the learning device 200 may input the keypoint heatmaps for training and the part affinity fields for training into the keypoint detecting device, to thereby allow the keypoint detecting device to extract keypoints for training from each of the keypoint heatmaps for training, and may group the extracted keypoints for training by referring to each of the part affinity fields for training, to thereby detect keypoints per the object for training which correspond to the object for training in the training image.

Next, the learning device 200 may instruct a loss layer to calculate one or more losses by referring to the keypoints per the object for training and their corresponding ground truths, and adjust one or more parameters of the feature extractor network and the keypoint heatmap & part affinity field extractor such that the losses are minimized by backpropagation using the losses.

The present disclosure has an effect of reducing cost by detecting the vehicle occupancy by analyzing the interior image of the vehicle taken by the camera, compared to a conventional sensor method.

The present disclosure has another effect of detecting the vehicle occupancy without regard to surroundings because the vehicle occupancy is detected by analyzing the interior image of the vehicle taken by the camera.

The present disclosure has still another effect of improving processing speed since information to be processed is less than that of the conventional sensor method, by detecting the vehicle occupancy through analyzing the interior image of the vehicle taken by the camera.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to those skilled in the art. Computer readable media include magnetic media such as hard disk, floppy disk, and magnetic tape, optical media such as CD-ROM and DVD, magnetooptical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present invention and vice versa.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for detecting a vehicle occupancy by using a passenger keypoint based on analysis of an interior image of a vehicle, comprising steps of:
   (a) if the interior image of the vehicle is acquired, a vehicle occupancy detecting device performing (i) a process of inputting the interior image into a feature extractor network, to thereby allow the feature extractor network to generate one or more feature tensors by applying convolution operation to the interior image, (ii) a process of inputting the feature tensors into a keypoint heatmap and part affinity field extractor, to thereby allow the keypoint heatmap and part affinity field extractor to generate keypoint heatmaps and part affinity fields for each of the feature tensors, (iii) a process of inputting the keypoint heatmaps and the part affinity fields into a keypoint detecting device, to thereby allow the keypoint detecting device to extract keypoints from each of the keypoint heatmaps, and (iv) a process of grouping the extracted keypoints by referring to each of the part affinity fields, to thereby detect keypoints per each of passengers corresponding to each of passengers in the interior image; and
   (b) the vehicle occupancy detecting device performing a process of inputting the keypoints per each of the passengers into a seat occupation matcher, to thereby allow the seat occupation matcher to match each of the passengers with each of seats of the vehicle by referring to the keypoints per each of the passengers and preset region of interests (ROIs) for each of the seats and thus to detect the vehicle occupancy.

2. The method of claim 1, wherein, at the step of (a), the vehicle occupancy detecting device performs a process of inputting the interior image into the feature extractor network, to thereby allow the feature extractor network to apply multiple convolution operations, by convolutional blocks including one or more convolutional layers performing the multiple convolution operations, to the interior image.

3. The method of claim 1, wherein, at the step of (a), the vehicle occupancy detecting device performs a process of inputting the feature tensors into the keypoint heatmap and part affinity field extractor, to thereby allow the keypoint heatmap and part affinity field extractor to apply convolution operation, by a fully convolutional network or 1×1 convolutional layers, to the feature tensors and thus to generate the keypoint heatmaps and the part affinity fields for each of the feature tensors.

4. The method of claim 1, wherein, at the step of (a), the vehicle occupancy detecting device performs a process of inputting the keypoint heatmaps and the part affinity fields into the keypoint detecting device, to thereby allow the keypoint detecting device to extract each of highest points on each of the keypoint heatmaps as each of the keypoints corresponding to said each of the keypoint heatmaps.

5. The method of claim 4, wherein the vehicle occupancy detecting device allows the keypoint detecting device to pair the keypoints, respectively having their own corresponding highest probabilities of being connected to each other among the extracted keypoints by referring to the part affinity fields, to thereby group the extracted keypoints.

6. The method of claim 1, wherein, at the step of (b), the vehicle occupancy detecting device performs a process of instructing the seat occupation matcher to calculate each of mean points of the keypoints per each of the passengers and each of variances of the keypoints per each of the passengers and to match each of the passengers with each of the seats by confirming whether (i) the keypoints per each of the passengers, (ii) each of the mean points of the keypoints per each of the passengers and (iii) each of the variances of the keypoints per each of the passengers satisfy at least one preset condition, for each of the preset ROIs for each of the seats.

7. The method of claim 6, wherein the vehicle occupancy detecting device performs a process of instructing the seat occupation matcher to match a specific passenger with a specific seat (i) if a specific mean point corresponding to the specific passenger is located in a specific ROI, (ii) if a specific variance corresponding to the specific passenger is lower than a first preset threshold, and (iii) if the number of specific keypoints corresponding to the specific passenger located in the specific ROI is larger than a second preset threshold, for the specific ROI of the specific seat.

8. The method of claim 1, wherein the feature extractor network and the keypoint heatmap and part affinity field extractor have been learned by a learning device performing, if at least one training image including one or more objects for training is acquired, (i) a process of inputting the training image into the feature extractor network, to thereby allow the feature extractor network to generate one or more feature tensors for training by applying convolution operation to the training image, (ii) a process of inputting the feature tensors for training into the keypoint heatmap and part affinity field extractor, to thereby allow the keypoint heatmap & part affinity field extractor to generate keypoint heatmaps for training and part affinity fields for training for each of the feature tensors for training, (iii) a process of inputting the keypoint heatmaps for training and the part affinity fields for training into the keypoint detecting device, to thereby allow the keypoint detecting device to extract keypoints for training from each of the keypoint heatmaps for training and a process of grouping the extracted keypoints for training by referring to each of the part affinity fields for training, to thereby detect keypoints per each of the objects for training corresponding to each of the objects for training in the training image, and (iv) a process of allowing a loss layer to calculate one or more losses by referring to the keypoints per each of the objects for training and their corresponding ground truths, to thereby adjust one or more parameters of the feature extractor network and the keypoint heatmap & part affinity field extractor such that the losses are minimized by backpropagation using the losses.

9. A vehicle occupancy detecting device for detecting a vehicle occupancy by using a passenger keypoint based on analysis of an interior image of a vehicle, comprising:
- at least one memory that stores instructions; and
- at least one processor configured to execute the instructions to perform or support another device to perform: (I) if the interior image of the vehicle is acquired, (i) a process of inputting the interior image into a feature extractor network, to thereby allow the feature extractor network to generate one or more feature tensors by applying convolution operation to the interior image, (ii) a process of inputting the feature tensors into a keypoint heatmap and part affinity field extractor, to thereby allow the keypoint heatmap & part affinity field extractor to generate keypoint heatmaps and part affinity fields for each of the feature tensors, (iii) a process of inputting the keypoint heatmaps and the part affinity fields into a keypoint detecting device, to thereby allow the keypoint detecting device to extract keypoints from each of the keypoint heatmaps, and (iv) a process of grouping the extracted keypoints by referring to each of the part affinity fields, to thereby detect keypoints per each of passengers corresponding to each of passengers in the interior image, and (II) a process of inputting the keypoints per each of the passengers into a seat occupation matcher, to thereby allow the seat occupation matcher to match each of the passengers with each of seats of the vehicle by referring to the keypoints per each of the passengers and preset region of interests (ROIs) for each of the seats and thus to detect the vehicle occupancy.

10. The vehicle occupancy detecting device of claim 9, wherein, at the process of (I), the processor performs a process of inputting the interior image into the feature extractor network, to thereby allow the feature extractor network to apply multiple convolution operations, by convolutional blocks including one or more convolutional layers performing the multiple convolution operations, to the interior image.

11. The vehicle occupancy detecting device of claim 9, wherein, at the process of (I), the processor performs a process of inputting the feature tensors into the keypoint heatmap and part affinity field extractor, to thereby allow the keypoint heatmap & part affinity field extractor to apply convolution operation, by a fully convolutional network or 1×1 convolutional layers, to the feature tensors and thus to generate the keypoint heatmaps and the part affinity fields for each of the feature tensors.

12. The vehicle occupancy detecting device of claim 9, wherein, at the process of (I), the processor performs a process of inputting the keypoint heatmaps and the part affinity fields into the keypoint detecting device, to thereby allow the keypoint detecting device to extract each of highest points on each of the keypoint heatmaps as each of the keypoints corresponding to said each of the keypoint heatmaps.

13. The vehicle occupancy detecting device of claim 12, wherein the processor allows the keypoint detecting device to pair the keypoints, respectively having their own corresponding highest probabilities of being connected to each other among the extracted keypoints by referring to the part affinity fields, to thereby group the extracted keypoints.

14. The vehicle occupancy detecting device of claim 9, wherein, at the process of (II), the processor performs a process of instructing the seat occupation matcher to calculate each of mean points of the keypoints per each of the passengers and each of variances of the keypoints per each of the passengers and to match each of the passengers with each of the seats by confirming whether (i) the keypoints per each of the passengers, (ii) each of the mean points of the keypoints per each of the passengers and (iii) each of the variances of the keypoints per each of the passengers satisfy at least one preset condition, for each of the preset ROIs for each of the seats.

15. The vehicle occupancy detecting device of claim 14, wherein the processor performs a process of instructing the seat occupation matcher to match a specific passenger with a specific seat (i) if a specific mean point corresponding to the specific passenger is located in a specific ROI, (ii) if a specific variance corresponding to the specific passenger is lower than a first preset threshold, and (iii) if the number of specific keypoints corresponding to the specific passenger located in the specific ROI is larger than a second preset threshold, for the specific ROI of the specific seat.

16. The vehicle occupancy detecting device of claim 9, wherein the feature extractor network and the keypoint heatmap and part affinity field extractor have been learned by a learning device performing, if at least one training image including one or more objects for training is acquired, (i) a process of inputting the training image into the feature extractor network, to thereby allow the feature extractor network to generate one or more feature tensors for training by applying convolution operation to the training image, (ii) a process of inputting the feature tensors for training into the keypoint heatmap & part affinity field extractor, to thereby allow the keypoint heatmap & part affinity field extractor to generate keypoint heatmaps for training and part affinity fields for training for each of the feature tensors for training, (iii) a process of inputting the keypoint heatmaps for training and the part affinity fields for training into the keypoint detecting device, to thereby allow the keypoint detecting device to extract keypoints for training from each of the keypoint heatmaps for training and a process of grouping the extracted keypoints for training by referring to each of the part affinity fields for training, to thereby detect keypoints per each of the objects for training corresponding to each of the objects for training in the training image, and (iv) a process of allowing a loss layer to calculate one or more losses by referring to the keypoints per each of the objects for training and their corresponding ground truths, to thereby adjust one or more parameters of the feature extractor network and the keypoint heatmap & part affinity field extractor such that the losses are minimized by backpropagation using the losses.

* * * * *